Nov. 23, 1965   J. W. EDGEMOND, JR   3,218,790
FRUIT HARVESTING MACHINE
Filed May 28, 1962   8 Sheets-Sheet 5
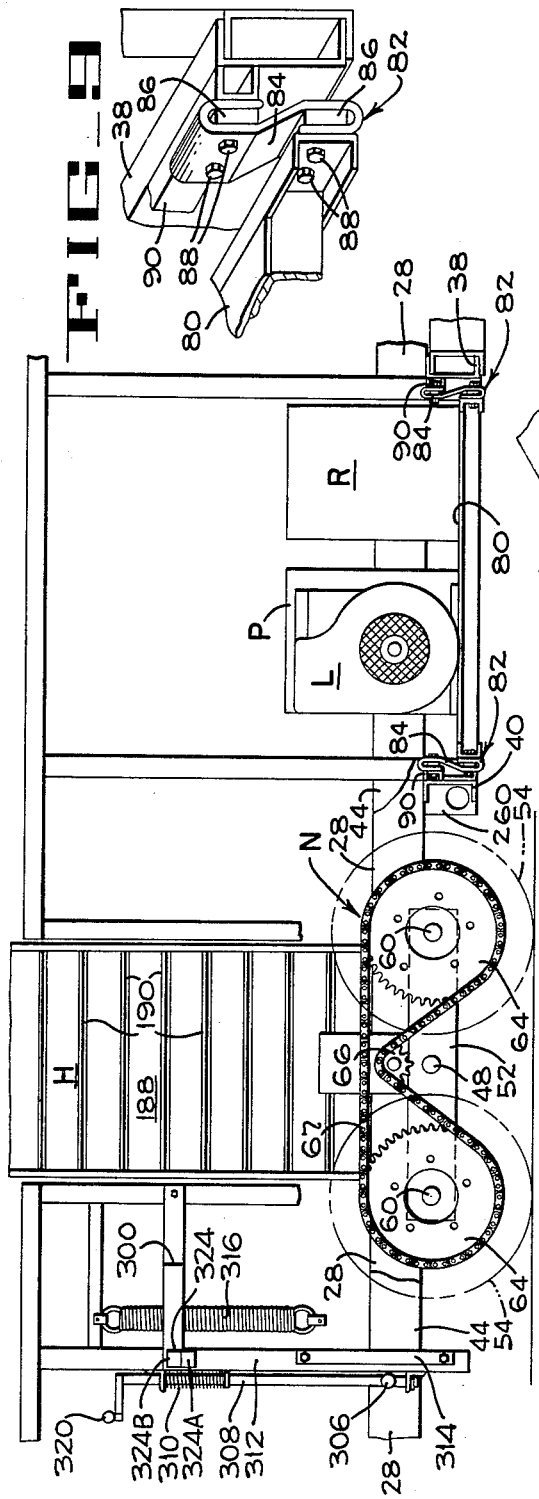
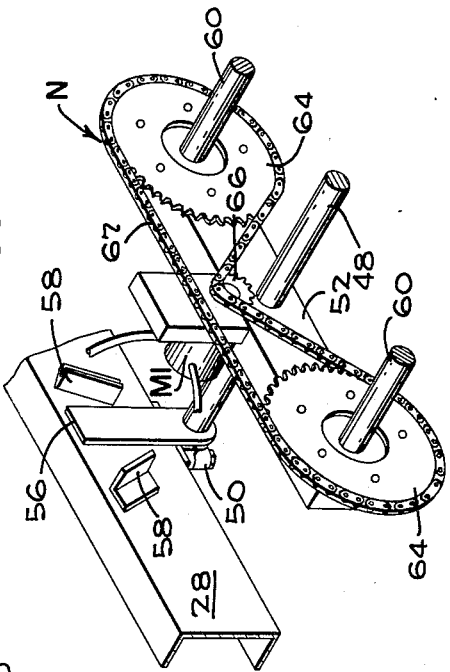
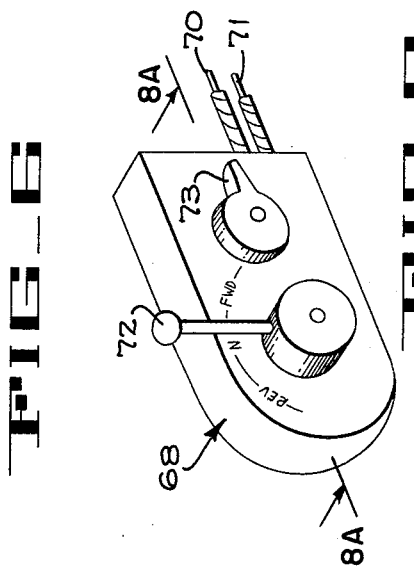
INVENTOR
JOHN W. EDGEMOND, JR.
BY Hans G. Hoffmeister
ATTORNEY

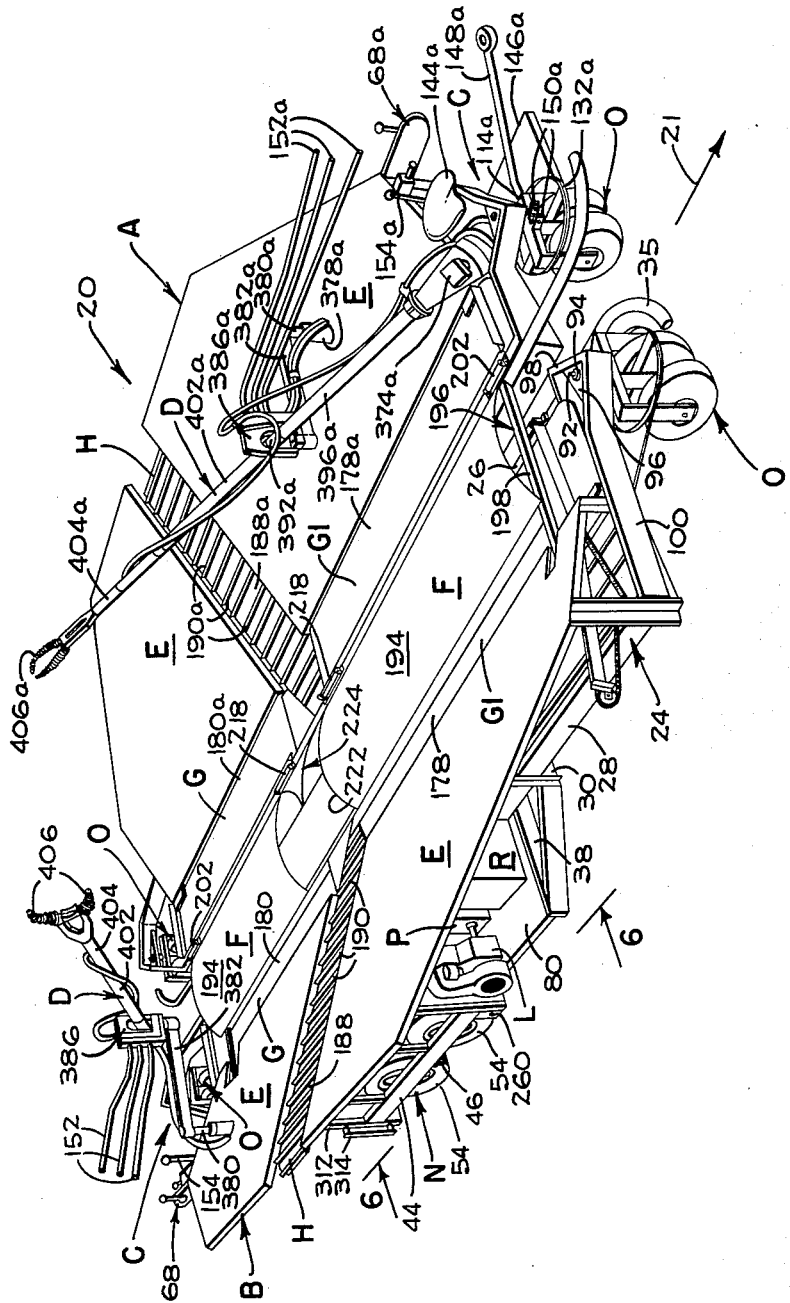

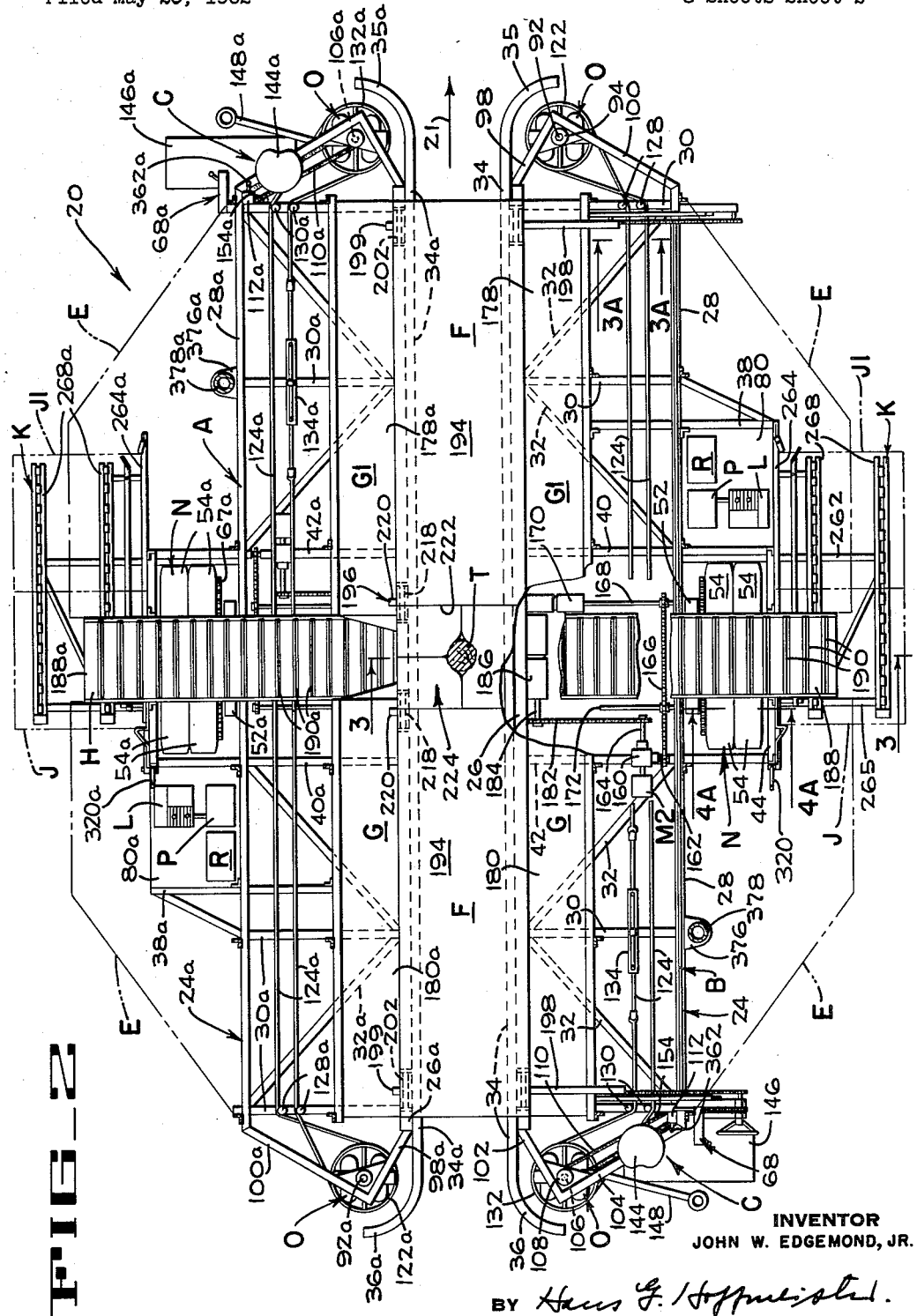

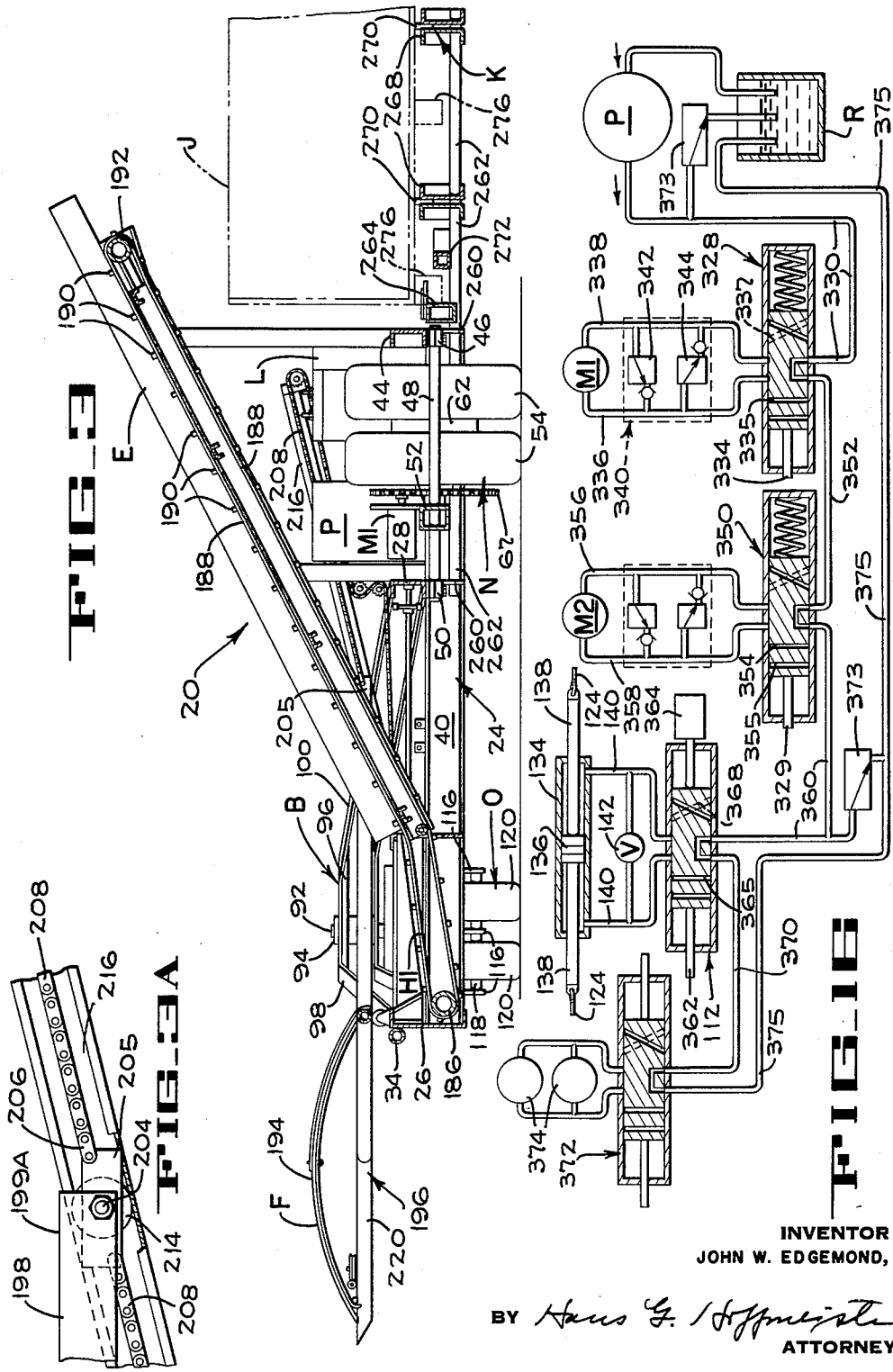

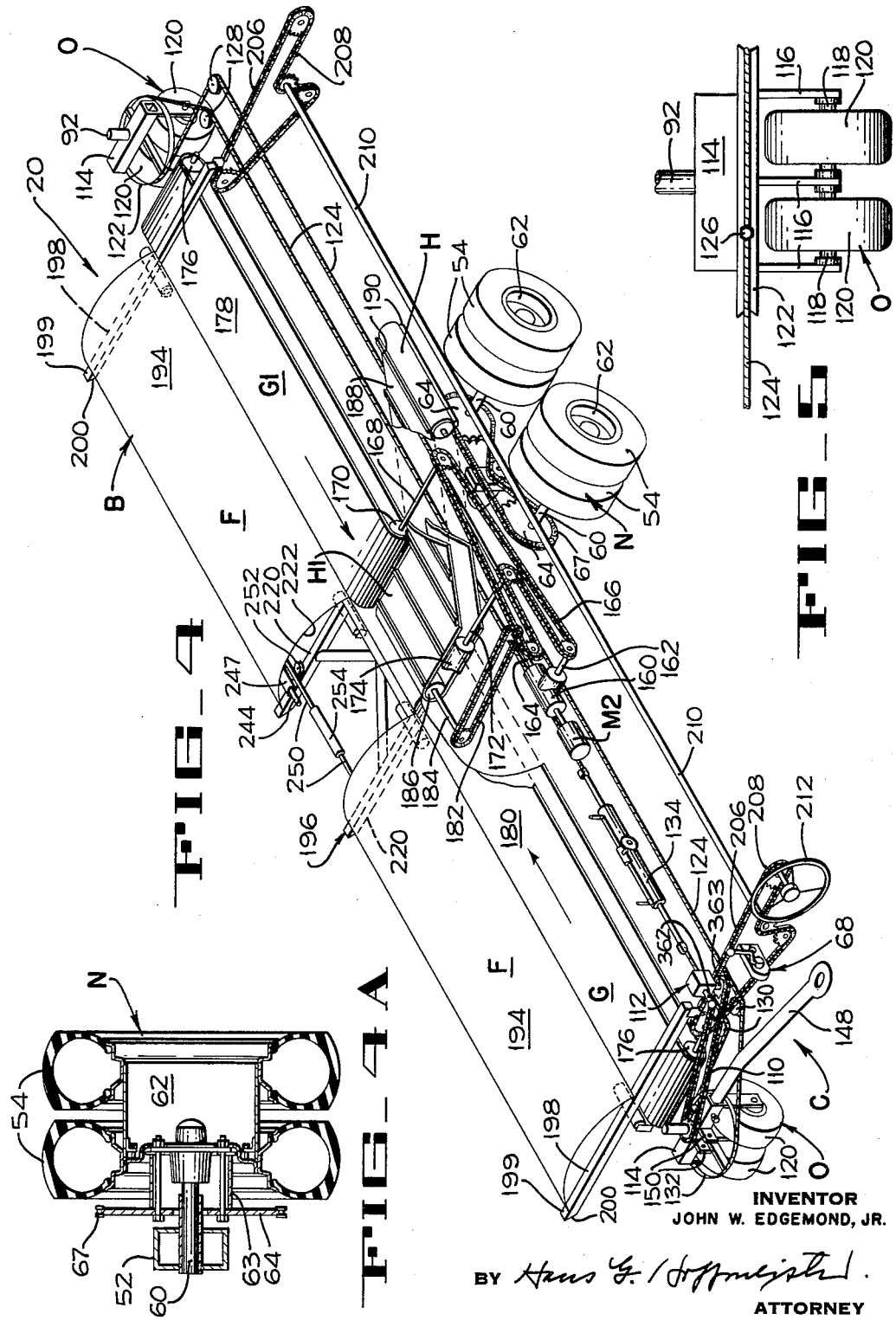

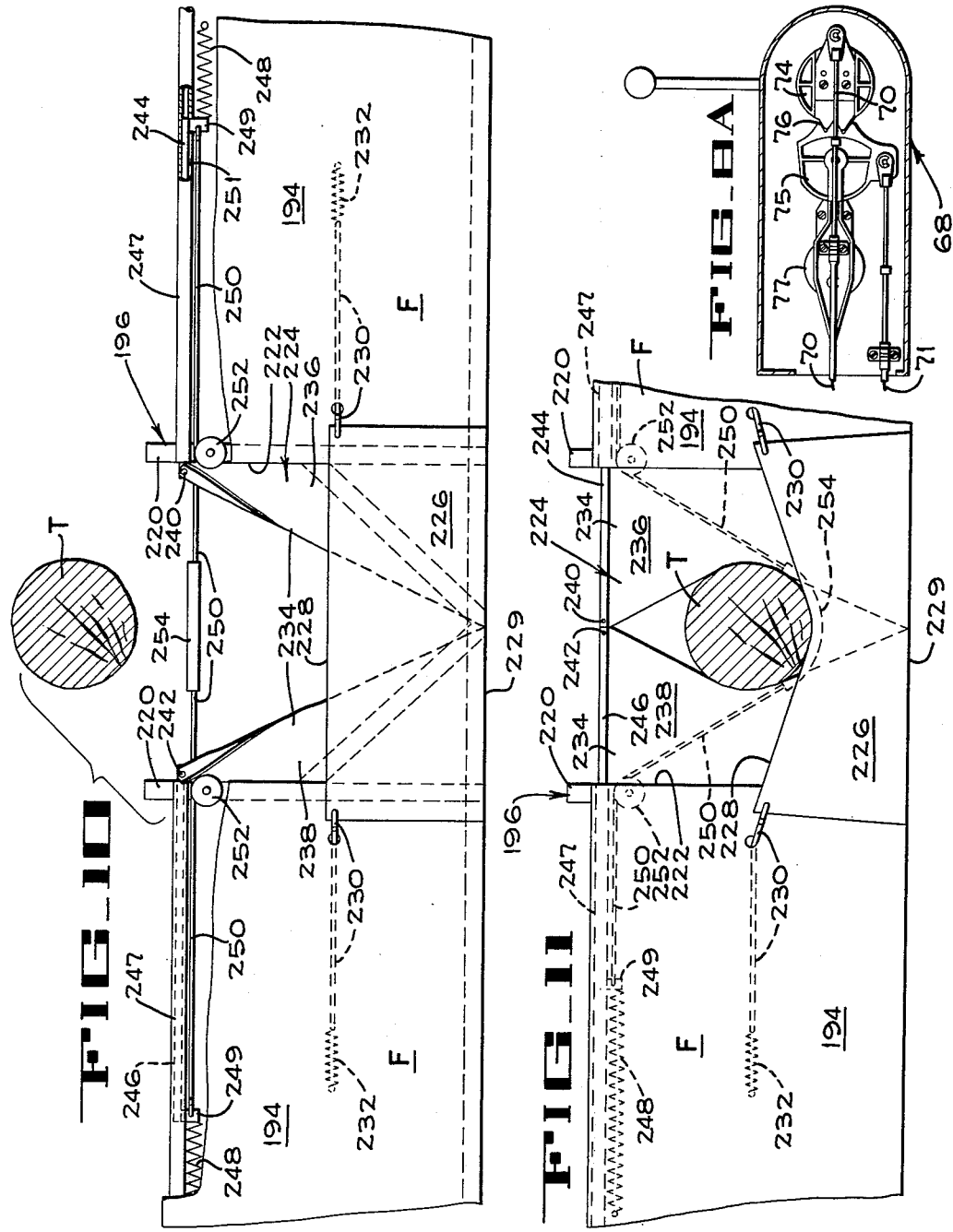

Nov. 23, 1965   J. W. EDGEMOND, JR   3,218,790
FRUIT HARVESTING MACHINE
Filed May 28, 1962   8 Sheets-Sheet 7
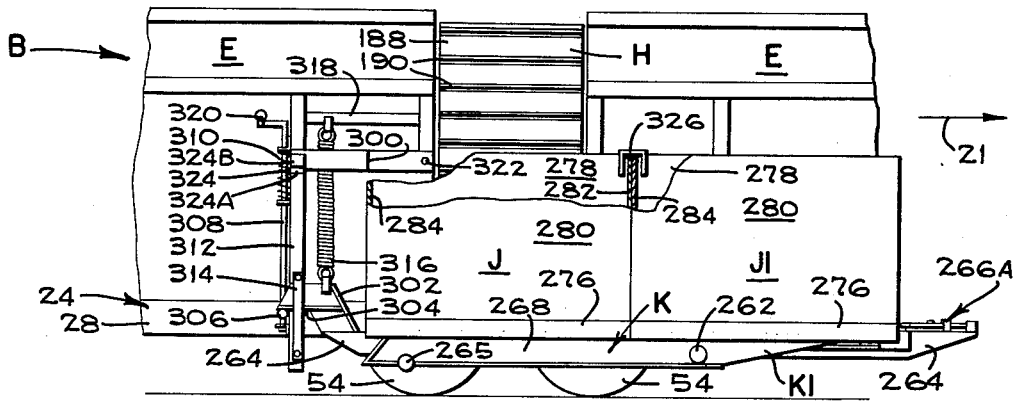
FIG_14
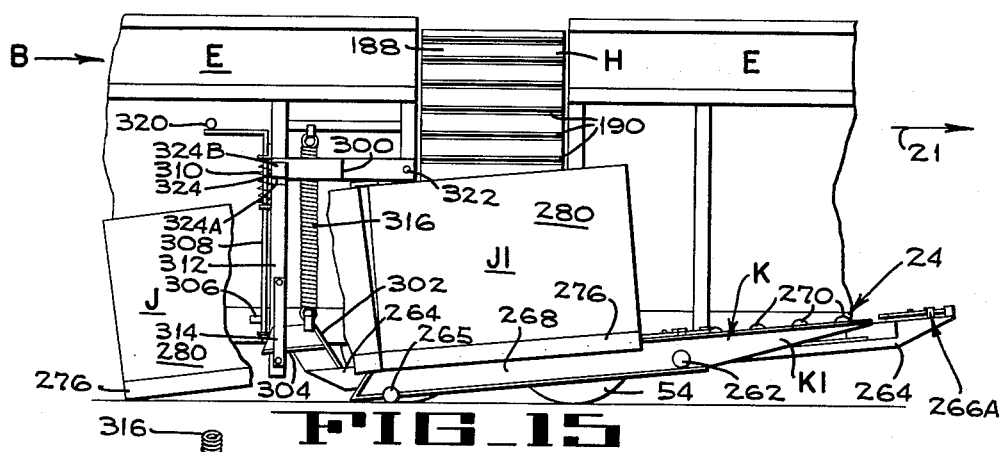
FIG_15
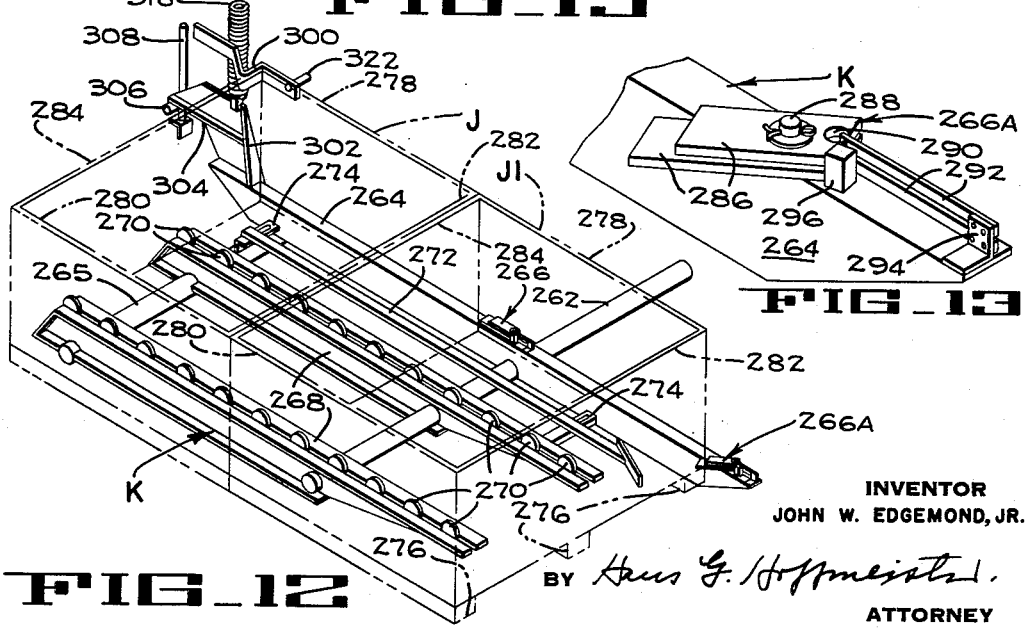
FIG_12   FIG_13
INVENTOR
JOHN W. EDGEMOND, JR.
BY Hans G. Hoffmeister
ATTORNEY Nov. 23, 1965   J. W. EDGEMOND, JR   3,218,790
FRUIT HARVESTING MACHINE
Filed May 28, 1962   8 Sheets-Sheet 8
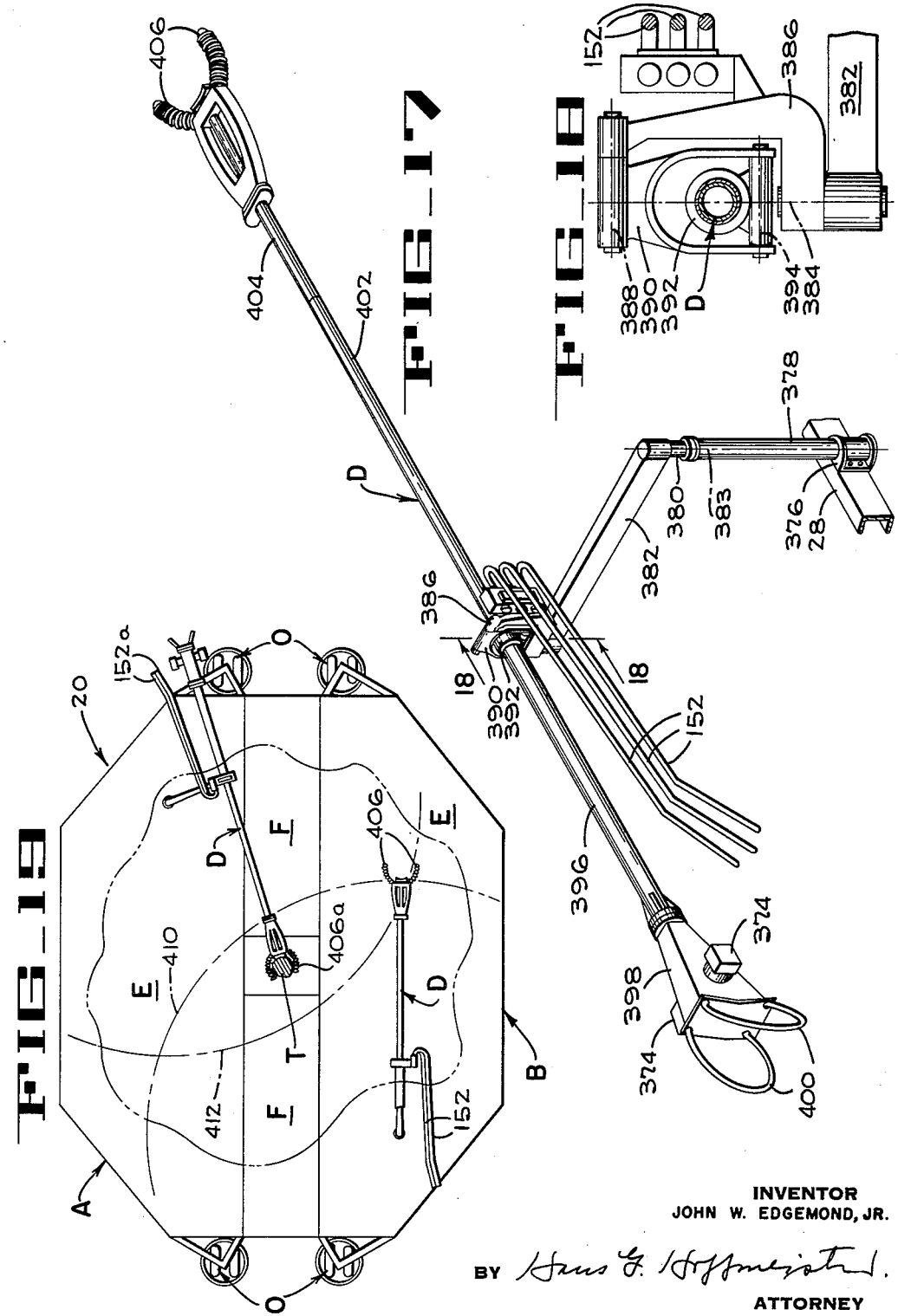
INVENTOR
JOHN W. EDGEMOND, JR.
BY Hans G. Hoffmeister
ATTORNEY United States Patent Office 3,218,790
Patented Nov. 23, 1965

3,218,790
FRUIT HARVESTING MACHINE
John W. Edgemond, Jr., Los Gatos, Calif., assignor to FMC Corporation, San Jose, Calif., a corporation of Delaware
Filed May 28, 1962, Ser. No. 198,231
17 Claims. (Cl. 56—329)

The present invention pertains to a machine for harvesting fruit from trees, and more particularly to a self-powered harvesting machine having means for dislodging, collecting and boxing the fruit.

Several different types of fruit harvesting machines have been devised in the past in an attempt to provide fruit growers with means for avoiding the uncertainty of having transient workers at hand when the proper harvesting time arrives, and for economic and other reasons. Certain disadvantages of these machines, however, have largely offset the advantages which have been obtained. For example, many such machines are difficult to maneuver into harvesting positions. As a result, not only is much time lost from the fruit harvesting operations, but the tree trunks are often damaged because the harvester cannot be precisely controlled on the rough orchard ground. The cambium layer of the tree trunk, consequently, is sometimes scarred to such an extent that the tree will die. Trees thus damaged are, at the very least, made more prone to disease and require more care than the healthy trees, and damage to the cambium layer inhibits the gorwth of the tree. Another drawback of prior harvesting machines of the box-filling type is that the machines handle the usual lug boxes which, because the boxes are relatively small, necessarily entail extensive manual handling in assembling truck loads or stacks of filled boxes.

The harvesting machine of the present invention substantially overcomes the above-mentioned disadvantages by providing two independently steered and separately powered cooperating machine sections which are capable of being rapidly maneuvered into harvesting positions along a row of trees, and are easily and quickly moved from one tree row to the next. The harvesting machine of this invention simultaneously harvests the entire crop from the tree, packs the harvested fruit in large open top boxes, and discharges the boxes in the lane between adjacent tree rows for easy access to the filled boxes by the usual field trucks. The boxes hold approximately twenty-four times as much fruit as is accommodated in the usual fifty pound lug and thus the manual box handling operations are minimized.

Accordingly, one of the objects of the present invention is to provide an improved fruit harvesting machine for harvesting, collecting and boxing fruit from orchard trees.

Another object of this invention is to provide a self-powered fruit harvesting machine having an improved three point suspension system which maintains maximum traction of the drive wheels and minimizes both torsional stresses in the frame structure and ground compaction adjacent the trees.

Another object of this invention is to provide an improved fruit harvesting machine which is adapted to be maneuvered into fruit harvesting positions with little danger of scarring the trees, and without requiring a reverse operation to move from a harvested tree to the next tree in the row.

Another object is to provide an improved power drive train and an improved steering system for a self-propelled fruit harvesting machine.

A further object of the invention is to provide a fruit harvesting machine having an improved shaker boom arrangement for simultaneously dislodging fruit from opposite sides of a tree.

Another object is to provide an improved box carrier mechanism which facilitates the pick-up of empty boxes and the discharge of the boxes after they are filled at selected points beside the path of movement of the harvesting machine.

Another object of the invention is to provide improved fruit collection means for a fruit harvesting machine, said collection means intercepting substantially all fruit shaken from the tree and being automatically sealed around the trunk of the tree so as to prevent loss of harvested fruit.

Other objects and advantages of the present invention will become apparent from the following description, and from the accompanying drawings, wherein:

FIGURE 1 is a diagrammatic perspective of two cooperating separate machine sections comprising the fruit harvesting machine of the present invention, and is viewed from the leading end of the fruit harvesting machine.

FIGURE 2 is a diagrammatic plan of the harvesting machine with the fruit collecting panels removed to show the support, drive, and steering structures which would otherwise be concealed.

FIGURE 3 is a diagrammatic vertical section, taken along lines 3—3 on FIGURE 2, of one of the two separate machine sections comprising the harvesting machine of the present invention.

FIGURE 3A is an enlarged fragmentary elevation taken looking in the direction of arrows 3A—3A in FIGURE 2.

FIGURE 4 is a schematic perspective of the drive train for one of the two separate sections of the harvesting machine.

FIGURE 4A is an enlarged vertical section taken substantially along line 4A—4A of FIGURE 2.

FIGURE 5 is a fragmentary elevation of the leading one of the two steerable wheel assemblies shown in FIGURE 4.

FIGURE 6 is an enlarged fragmentary side elevation, with parts broken away and parts shown in phantom lines, taken in the directions of the arrows 6—6 of FIGURE 1, and particularly illustrating details of the traction drive train and a box carrier mounting of one of the two sections of the harvesting machine.

FIGURE 7 is a schematic fragmentary perspective of the drive and the mounting mechanism for the driving wheels of one of the two cooperating sections of the machine.

FIGURE 8 is a perspective of a combined throttle and hydraulic valve control unit for governing drive and pumping means associated with one of the two harvesting machine sections.

FIGURE 8A is a vertical section taken along line 8A—8A of FIGURE 8.

FIGURE 9 is a fragmentary perspective of a shock damping mounting for isolating vibrations, originating at the engine and pump, from the main frame of one machine section.

FIGURES 10 and 11 are fragmentary plans illustrating successive operational positions of an automatic closure member for sealing around the trunk of a tree being harvested.

FIGURE 12 is a perspective of the removable box carrier mechanism which is associated with the box carrier mounting and actuating means shown in FIGURE 2.

FIGURE 13 is an enlarged fragmentary perspective of a box latch mechanism shown at the lower corner of FIGURE 12.

FIGURES 14 and 15 are side elevations of the box carrier mechanism shown in FIGURE 12, particularly illustrating two successive operational positions occurring during the box loading and discharging operations.

FIGURE 16 is a schematic diagram of the hydraulic circuit for controlling the conveyors, elevator, shaker boom and traction drive motor of one of the two separate machine sections which comprise the harvesting machine.

FIGURE 17 is a perspective of one of the two shaker booms of the harvesting machine by means of which fruit is vibrated loose from the limbs of the tree.

FIGURE 18 is a vertical section through the shaker boom shown in FIGURE 17, and is taken on line 18—18 thereon.

FIGURE 19 is a schematic plan of the harvesting machine, particularly illustrating the reach of the shaker booms with respect to the tree being harvested.

In general, the fruit harvesting machine 20 of the present invention (FIGS. 1 and 2) is formed in two separate, elongate, self-powered machine sections A and B which, at the start of a harvesting operation, are moved forwardly into harvesting position in the direction of the arrow 21 and cooperate to form a single unit surrounding a centrally positioned tree trunk T in a row of orchard trees.

Each self-powered section A and B is controlled from a separate control station C by an operator who maneuvers the section into harvesting position and then manipulates the controls of a shaker boom structure D that is mounted on the section adjacent station C. The two shaker booms D are engageable with selected limbs on opposite sides of the tree and dislodge the fruit by rapidly vibrating the limbs. Fruit which is thus dislodged drops onto inclined guide panels E and onto a central, two-part shield F, which is carried by the machine section B and bridges the gap between the two machine sections A and B. The panels E and the shield F direct the fruit to a longitudinally aligned pair of oppositely moving, belt conveyors G and G1 in each section of the harvesting machine 20, and each pair of conveyors G and G1 carry the fruit to an elevator H which is positioned between the conveyors.

Each elevator H (FIG. 2) discharges the fruit into the trailing box J of two large open top boxes J and J1 (shown in phantom outline) which are carried by an outrigger box carrier mechanism K that is pivotally mounted on the frame of the machine. The box carriers K are removable to reduce the width of the machine sections A and B for highway travel, and have been omitted from FIGURE 1. When the trailing boxes J are filled with fruit, they are discharged rearwardly from the box carriers K onto the ground to be picked up later by a fork lift and loaded onto a truck for conveyance to the packing shed.

Each machine section A and B (FIG. 2) is individually powered by a gasoline engine L which drives a hydraulic pump P, the pump energizing a hydraulically actuated drive train which powers a drive wheel assembly N. Steering of each machine section is effected by two steerable wheel assemblies O, one at the leading end of the machine section and a similar wheel assembly O at the trailing end of the section.

The two machine sections A and B of the harvesting machine 20 are identical in construction except for the box carriers K, the central shield F which is carried by the machine section B, and minor details associated with the box carrier mounting. Thus, aside from the exceptions noted, the machine section B may be considered to be the machine section A turned end for end. Although the following detailed description is for the greater part directed to the machine section B, it is equally applicable to the machine section A, and the parts of section A, that correspond to parts of B, will be given the same reference numerals as the numerals on B with the suffix "a."

Section B (FIGS. 1–3) of the harvesting machine 20 is provided with an elongate frame structure 24 which includes two longitudinal main channel members 26 and 28 that are interconnected by a plurality of transverse channels 30, by diagonal brace members 32, and by other structural members as required. A longitudinal, tubular guide and bumper member 34, having an outwardly curved forward end portion 35 and a similarly curved rearward end portion 36, is secured to the inner vertical surface of the channel 26. Each curved end portion 35 and 36 of the bumper 34 protects the associated wheel assembly O. The two wheel assemblies O are longitudinally aligned and are interconnected for simultaneous steering movement in opposite directions, as will appear later.

Near the central portion of the frame 24 three transverse frame channels 38, 40 and 42 are secured to the longitudinal channels 26 and 28, and project outwardly beyond the channel 28 to mount the drive wheel assembly N for the machine section, and also to carry the associated box carrier K. The channels 40 and 42 (FIGS. 2, 3 and 6) are interconnected at their outer ends by a channel member 44 which has a bearing 46 secured to its lower edge. The bearing 46 mounts one end portion of a rockshaft 48 which projects transversely of the machine between the front and rear wheels of the wheel assembly N and is journalled in a bearing 50 (FIG. 7) that is bolted to the lower edge of the channel 28.

The rockshaft 48 provides the pivot axis for a wheel support beam 52 (FIGS. 6 and 7) which is secured to the shaft 48 for fore and aft rocking movement when the harvesting machine 20 travels over uneven ground surfaces, in order to maintain traction of tandem pairs of drive wheels 54 which are carried by the beam 52. Rocking movement of the drive wheel assembly N is limited by means of an upright bar 56 (FIG. 7) which is secured to the rockshaft 48 and has an upper portion positioned between two stop members 58 that are welded to the channel 28.

The leading and trailing pairs of the drive wheels 54 (FIG. 6) are equidistant from the rockshaft 48 and are rotatably mounted upon stub axles 60 which are welded to the beam 52 and project outwardly therefrom. Each pair of drive wheels is provided with a single hub assembly 62 (FIGS. 3 and 4A), which is journalled on shaft 60 and is bolted to a cylindrical housing 63 that is fixed to a driven sprocket 64. The two sprockets 64 (FIGS. 6 and 7) are aligned with the drive sprocket 66 of a hydraulic motor M1, which is mounted upon the upper flange of the wheel support beam 52, and are interconnected for rotation with the sprocket 66 by an endless chain 67. Motor M1 is controlled by a combined throttle and hydraulic valve control unit 68 (FIGS. 2 and 8) which is mounted at the operator's station C.

The throttle and valve control unit 68 is a conventional, commercially available control device of the type used in conjunction with the engine throttle and gear change mechanisms in small boats. Each of the control units 68 used in the present machine is a Model ML Single Lever Outboard Motor Control manufactured by the Morse Instrument Company of Hudson, Ohio. Each control unit is provided with two flexible control cables 70 and 71 that are respectively connected to the throttle of engine L and to a valve, later described, which governs the drive motor M1. By means of the internal mechanism of the control unit, the throttle cable 70 may be actuated under certain conditions by either a shift lever 72 or a throttle lever 73 while the cable 71 can be actuated only by lever 72.

The shift lever 72 is movable from a Neutral, upright position to either Reverse or Forward. When the lever moves away from Neutral, no appreciable throttle actuation immediately occurs because the end of cable 70 (FIG. 8A) extends across the center of a disc 74 which is turned by the lever, and is anchored to the far side of the disc. As the anchored end of the cable moves away from the Neutral, or center position shown, the throttle cable 70 progressively opens the throttle of the engine L. At the same time, the valve cable 71 opens the aforementioned valve which controls the drive motor M1 because the valve cable 71 is anchored to a disc 75 which is turned by the disc 74 due to interengaging teeth at 76 of the two discs 74 and 75.

The throttle lever 73 (FIG. 8) is connected to a disc 77 (FIG. 8A) to which a part of the throttle cable 70 is anchored. As the throttle lever 73 is swung upward from the horizontal idle position shown in FIG. 8, the cable 70 opens the throttle, but due to the particular internal construction of such boat control units, the valve cable 71 will not in this instance be actuated. Accordingly, when the shift lever 72 is moved toward Forward or Reverse positions from Neutral, the engine L speeds up and the motor M1 is rotated in the direction the lever 72 is moved, by pressurized hydraulic fluid transmitted from the pump P. The hydraulic circuit is so arranged that when the motor M1 is not driven, or in other words when the shift lever 72 is at Neutral position, the pressurized fluid therein is balanced so that the motor "locks up" to arrest the motor sprocket 66. The motor M1, accordingly, acts as a brake to stop the drive wheels 54, and keeps the machine braked during the fruit harvesting operation. When the harvesting machine section B is maneuvered into an operative position by appropriate manipulation of the shift lever 72 and the motor M1 is holding the machine section braked in position, the throttle lever 73 is then advanced so that the engine continues to drive the pump P and energize other hydraulically powered mechanisms essential to the harvesting operation.

In general the mechanism of the control unit is such that shift lever 72 can be actuated only when throttle lever 73 is in idle position and, likewise, lever 73 can be actuated only when lever 72 is in Neutral position. Accordingly, when a machine section is being maneuvered to a position adjacent a tree, throttle lever 73 is in idle position and it cannot be accidentally moved out of this position while the vehicle is being maneuvered by shift lever 72. Similarly, when the machine is anchored adjacent the tree, the throttle lever 73 is actuated to control the speed of the operating mechanisms and the shift lever 72 cannot be accidentally moved from Neutral position.

The engine L (FIGS. 2, 6 and 9), the pump P and a hydraulic reservoir R are mounted upon a platform 80 which is suspended from the outer portions of the channels 38 and 40. The suspension of platform 80 is by means of four shock absorbing mountings 82, only two of which are shown. Each shock mounting 82 includes a section of rubberized fabric belting material 84, the upper and lower end portions of which are each doubled over a spacer block 86. Bolts 88 project through each doubled end portion of the belt 84, the upper bolts securing the shock mounting to a channel 90 which is welded to the channel member 38, and the lower bolts securing the shock mounting to the adjacent edge portion of the platform 80. Due to the resiliency of the belt material 84 in each shock mounting, vibrations originating at the engine L and pump P are damped by the shock mountings and are prevented from being transmitted to the main frame 24. Flexible hydraulic connections, not shown, to the pump P and the reservoir R accommodate the movement of the platform 80 relative to the frame 24.

Steering of the harvesting machine 20 (FIG. 2) is effected in a novel manner enabling each machine section A and B to pivot about the axis of the tree trunk T by means of the simultaneously steered, leading and trailing wheel assemblies O of each machine section. The leading wheel assembly O of section B (FIGS. 2, 4 and 5) is provided with a vertical turning pin 92 that is rotatable in a bearing 94 which is secured to a horizontal mounting plate 96. The mounting plate 96 is welded to the frame 24 at the juncture of upwardly and inwardly directed portions 98 and 100 of the longitudinal frame channels 26 and 28, respectively.

The channels 26 and 28 are similarly formed at the trailing end of the harvesting machine section B by upwardly and inwardly directed portions 102 and 104, and the trailing wheel assembly O is provided with a vertical turning pin 106 that is rotatable in a bearing 108. For a purpose which will be mentioned later in connection with a power steering feature of the machine, a chain and sprocket drive 110 (FIG. 4) is connected to the turning pin 106 and to a hydraulic steering control valve 112 which is mounted upon the frame 24 adjacent the operator's station C.

The pivot shaft 92 of the leading wheel assembly O (FIG. 5) is secured to a horizontal tube 114 which has three depending legs 116 that secure an axle 118 upon which a pair of high flotation wheels 120 are mounted. The trailing steering assembly O is similarly provided with an axle 118 and a pair of high flotation wheels 120. Rotation of both steering assemblies O about the axes of the vertical turning pins 92 and 106 is effected by means including a cable pulley 122 (FIG. 5) that is rigidly attached to the leading steering wheel assembly O, and a cable 124 which is trained around the pulley. The cable 124 is anchored to the pulley at 126 and is trained around two idler pulleys 128 (FIG. 4) that are rotatably mounted on the adjacent fixed frame member 30. It will be noted that at the forward end of the machine, the runs of the cable 124 are crossed between the pulley 122 and the idler pulleys 128.

From the idler pulleys 128 the two runs of the cable extend longitudinally along the frame 24 to the trailing steering wheel assembly O. At the trailing steering wheel assembly, the cable runs are trained around two fixed idler pulleys 130 (FIG. 2) and around a pulley 132, which respectively correspond to the pulleys 128 and 122 of the leading wheel assembly O. Since the runs of the cable 124 adjacent the trailing end of the machine are not crossed, it will be apparent that rotation of one steering wheel assembly O about its vertical turning axis is opposite to the direction of rotation of the other wheel assembly O. This reverse steering arrangement is an important feature of the present invention and enables the rapid maneuvering of each machine section A and B of the harvesting machine 20 because the axles 118 of the leading and trailing wheel assemblies O can be moved to positions where each axle 118 lies on a radial line from the axis of the tree trunk T. Accordingly, each machine section A and B can pivot around the tree trunk T in moving from the last tree in one row to the first tree in the next row. This described reverse steering feature also aids in rapidly moving the harvesting machine sections laterally when they are being steered into harvesting positions, so as to minimize the time required in positioning the harvesting machine 20 between harvesting operations.

The wheel assemblies O are steered by either of two steering systems, one a manual system, and the other a power steering system. Power steering of the machine section B (FIGS. 2 and 4) is effected by a double-acting hydraulic ram 134 which is mounted upon one of the fixed frame channels 30. The cylinder of the ram 134 (FIG. 16) is provided with a piston 136 secured to the central portion of a connecting rod 138 which projects uniformly from each end of the ram when the wheel assemblies O are positioned straight ahead. Both free ends of the connecting rod 138 are secured to the inner run of the cable 124. When pressurized fluid is transmitted to the ram 134 by an actuation of the control valve 112, pressurized fluid from the pump P is transmitted to one or the other of two conduits 140 which are connected to the ram 134. The ram is thus caused to move the inner run of the cable and the leading and trailing steering wheel assemblies O are simultaneously steered in opposite directions. The power steering operation can be by-passed by opening a valve 142 which interconnects the conduits 140, in which case the connecting rod 138, since it extends completely through the ram, transfers the cable movement from one end of the ram 134 to the other.

The operator's station C (FIG. 2) is provided with a seat 144 and a foot platform 146, mainly for the convenience of the operator when moving the machine section into the orchard. During such movement, the operator's station is on the leading end of the machine. In actual harvesting operations, after the machine section has arrived alongside a tree row and has been turned end for end, the operator's station is on the trailing end of the machine and the operator faces the machine and usually sits upon a tiller bar 148 (FIG. 4) which is removably mounted within the tube 114 of the trailing steering assembly O. For moving the harvesting machine any considerable distance, the machine section B may be towed on the highway by removing the tiller bar 148 from the tube 114, and coupling the bar to a pair of tabs 150, which are welded to the front surface of the tube 114, so that the bar 148 acts as a tow bar. During harvesting operations, the operator may also walk beside the machine adjacent his station C since all of the controls of the machine section remain readily accessible.

Since the operator's station C (FIG. 2) of the machine section A is adjacent the leading end of the machine section B, the operators of the machine sections A and B face each other during harvesting operations, and are located for convenient access to the hydraulic steering control valves 112 and 112a (FIG. 1), to a group of control rods 152 and 152a which govern the shaker boom structures D, and to the throttle and motor control units 68 and 68a. Also positioned for easy access by the operator of each machine section are control levers 154 and 154a, each of which governs valve means of the associated machine section A or B. The valve actuated by the lever 154 controls a hydraulically operated elevator motor M2 (FIG. 4) that is powered from the drive train, to be described presently, of the machine section B.

The elevator motor M2 (FIGS. 2-4) is connected to a gear box 160 that is provided with two output shafts, a shaft 162 and a shaft 164. The output shaft 162 drives a roller chain and sprocket drive train 166 which is connected to a driven shaft 168 that is secured to a drive roller 170 of the endless belt conveyors G1. The other conveyor G is similarly driven from the drive train 166 by means of a shaft 172 which is secured to a drive roller 174. An idler roller 176 is associated with each of the drive rollers 170 and 174, and a belt 180 and a belt 178, respectively, form the conveying surfaces of the conveyors G and G1. The output shaft 164 of the gear box is connected by a chain and sprocket drive train 182 to a driven shaft 184 which is secured to a drive roller 186 of the elevator conveyor H. Conveyor H (FIG. 3) comprises a flat belt 188 having a plurality of transverse pusher bars 190 secured to its outer surface. The belt is trained around the drive roller 188 and around an upper idler roller 192 which is located adjacent the outer edge of the guide panels E so that the fruit drops into the trailing box J.

The upper, conveying flights of the belts 178 and 180 (FIG. 4) both advance toward the elevator H so that fruit rolling down the guide panels E is conveyed to, and deposited upon, a generally horizontal lower end portion H1 (FIG. 3) of the elevator H, said end portion forming a fruit collection station at which all fruit handled by the machine section B collects for conveyance to the discharge end of the elevator. Since the two belts 178 and 180 of the conveyors G1 and G simultaneously deliver fruit to the one elevator H, the elevator is run at twice the speed of the conveyors G so as to prevent fruit from piling up at the fruit collecting station.

The two-part shield member F (FIGS. 2 and 4) which may be projected from the machine section B to bridge the gap between the two machine sections A and B, includes two curved sheet metal plates 194 that form the upper surface of the shield and are mounted upon a fabricated support frame 196. Each end of the frame 196 includes a tubular support 198, the distal end 199 of each tube having a bevelled end 200 which rides up over, and is supported by, an associated roller 202 (FIG. 2) on the machine section A. Similar tubular supports 220 (FIG. 4) are provided adjacent the center of the shield, said supports having end portions which overlie rollers 218 (FIG. 2) on the machine section A. In FIGURE 1 the shields F are shown just before the bevelled ends of the tubes 198 and 220 are engaged and ride up over the rollers 202 and 218 to operating position. The tubular supports 220 define the leading and trailing edges of a central aperture 222 in the two-part shield member F.

The other ends of the tubes 198 extend over the adjacent conveyors G and G1 and the outermost end 199A (FIG. 3A) of each tube 198 is supported by means of a roller 214 disposed in a fixed channel track 216. The roller is pivoted by a bolt 204 (FIG. 3A) to a plate 205 that is fixed in the upper flight of a chain 206 of a chain and sprocket drive unit 208. The two chain and sprocket drives 208 (FIG. 4) at the leading and trailing ends of the machine, respectively, are interconnected by a shaft 210 which is rotatable by means of a wheel 212 that is mounted adjacent the operator's station C. Clockwise rotation of the wheel 212 causes the upper flights of the chains 206 to simultaneously move outwardly, thus causing the support frame 196 to carry the shield member F from its projected, operating position shown in FIGURES 2 and 4, to a position above the conveyors G and G1.

The aperture 222 (FIGS. 2, 4, 10 and 11) of shield F is provided with a flexible, heavy canvas closure 224 which automatically seals around the trunk of the tree T when the shield member F is projected laterally from the machine section B. The automatic closure 224 includes one canvas panel 226, which has a free margin 228 lying along the longitudinal center of the aperture 222 and of the shield F, and an opposite edge portion 229 that is secured to a longitudinal member (not shown) of the frame structure 196. The free corners of the panel 226 are each connected to an elastic cord 230 which is fastened to a tension spring 232 that is secured to the underside of the shield F. A two-piece flap 234, comprising generally rectangular canvas panels 236 and 238 which partially underlie the panel 226, is adapted to seal the other half of the aperture 222.

The adjacent corners of the panels 236 and 238 at the open end of the aperture 222 are secured at 240 and 242, respectively, to the ends of slidable closure rods 244 and 246, and are secured along their edges to the adjacent edges of the shield F. Panels 236 and 238 are also secured to longitudinal members of the shield frame structure 196 adjacent the closed longitudinal edge of the aperture 222.

Each closure rod 244 and 246 is slidably mounted in a fixed tube 247 that extends longitudinally along the distal edge of the shield member F and each rod is urged toward a retracted position under the shield by a tension spring 248. Each spring is anchored to the shield and is secured to a tab 249 on the closure rod that projects through a slot 251 in the associated guide tube 247. Each end of a tree-engaging cable 250 is fastened to one of the tabs 249 on closure rods 244 and 246. Pulleys 252 are mounted on the tubular supports 220 under the shield F to guide the cable 250, and the center portion of the cable is covered with a resilient guard 254 to prevent cutting the trunk of the tree T.

When the shield F (FIG. 11) is projected from the machine section B, the guard 254 contacts the trunk of the tree T and the cable 250 is displaced toward the center of the aperture 222. The cable thus pulls the closure rods 244 and 246 toward each other and causes the flexible panels 236 and 238 to close around the trunk of the tree. At the same time, the free edge of the panel 226 engages the other side of the trunk and completes the closure around the tree trunk so that the fruit dislodged during harvesting will be deflected onto the conveyors G and G1 of the two machine sections A and B. Although it has not been found necessary to do so, the panels 236 and 238 can effect a more perfect seal, if desired, by slightly modifying the arrangement illustrated so that the two closure rods 244 and 246 overlap in their projected positions.

The box carrier mechanisms K (FIG. 2) both operate in the same manner, but are oppositely arranged so that a left-hand box carrier is provided for the machine section A and a right-hand box carrier for the machine section B. Accordingly, except for the reverse arrangement noted, and for minor details later disclosed, the carriers are identical and a description of one carrier will suffice for both.

The box carrier K (FIGS. 12–15) for machine section B is pivotally mounted upon the frame 24 (FIGS. 2 and 3) by means of two, relatively short transversely spaced, vertical bearing plates 260, one of which is welded to the underside of the frame channel 28 and the other of which is welded to the channel 44. The bearing plates 260 are each apertured to receive a large diameter hinge shaft 262 (FIG. 12) which provides a pivot axis for the box carrier K so that the trailing end of the carrier is movable to and from engagement with the ground. The uppermost position of the box carrier K is the substantially horizontal box loading position illustrated in FIGURE 14, and the tilted box discharge position is shown in FIGURE 15.

The hinge shaft 262 (FIG. 12) projects through, and is welded to, an inner support channel 264 having two spaced box latches 266 and 266A on its upper edge, and through two transversely spaced fabricated support beams 268. A rear transverse bar 265 also interconnects the two beams 268 to the channel 264 whereby a rigid support frame is defined. Each of the beams 268 is provided with a plurality of freely rotatable rollers 270 which form conveying surfaces to support the two boxes J and J1 (shown in phantom lines). Between the support channel 264 and the adjacent beam 268, a longitudinally-extending box guide bar 272 is adjustably bolted to a pair of fixed slotted angle bars 274. The guide bar 272 is spaced from the channel 264 to define a guide channel adapted to receive the inner one of three support rails 276 which are integrally formed on the undersurface of the bottom panel of each box J, as seen in FIGURE 3.

The support rails 276 define channels on the bottom of the box so that the box can be handled by a fork lift truck. Each box is approximately four feet square by three feet high and includes inner and outer side walls 278 and 280 (FIG. 14), respectively, and leading and trailing end walls 282 and 284. Each box will accommodate approximately twelve hundred pounds of prunes, or about twenty-four times the contents of the usual lug boxes used in other harvesting machines.

Empty boxes J are placed along the path of the box carriers K before the harvesting operation begins. As the leading end K1 (FIG. 14) of a box carrier approaches an empty box in its path, the adjacent end of the box is manually raised so that the box carrier K is driven under the box due to the forward movement in the direction of arrow 21 of the harvesting machine 20.

As will be presently described in greater detail, when the boxes J are moved onto the box carrier K from the leading end of the carrier, the box latches 266 and 266A are cammed aside by the adjacent lower rail 276 of the box. The leading box latch 266A ultimately engages the front wall 282 of the leading box J to prevent both boxes from being dislodged forwardly off the rollers 270 during movement of the vehicle and operation of the shaker boom.

Each box latch 266 and 266A (FIG. 13) includes two parallel latch plates 286 of different lengths which are pivotally mounted on a pin 288 that is secured to the support channel 264. Each of the latch plates 286 is provided with a semi-circular recess 290 (only the recess 290 of the upper latch plate 286 being shown) which receives one end of an associated flat leaf spring 292. The other ends of the two springs 292 are secured to a support strap 294 which is welded to the upper surface of the channel 264. Each latch plate 286 is thus independently spring-urged against a stop block 296 which limits its inward movement toward the boxes J, and both latch plates 286 are cammed toward the channel 264 by each incoming box J.

The horizontal dimensions of the boxes J vary slightly, so the combined lengths of whichever two boxes are on the box carrier K is known only within certain limits. Thus, two of the longest boxes will extend from a fixed box abutment strap 300, which is engaged by the trailing end wall 284 of the first box loaded on the carrier K, to the short upper latch plate 286 of the box latch 266 located on the front of the box carrier. Two of the shortest boxes will extend only as far from the box abutment strap 300 as the adjacent end of the longer, lower latch plate 286. In either case, at least one of the two latch plates will spring to its latching position against the front wall 282 of the leading box J when the trailing box is seated against the box abutment strap 300 and the leading box abuts the trailing box.

When the trailing box is filled with fruit dropped from the elevator H, the box may then be discharged rearwardly onto the ground. During such discharge, the leading box is automatically moved rearwardly into the loading position just vacated by the filled box. Accordingly, the box latch mechanism 266 which is mounted near the center of the channel 264 functions, in the manner just described for the forwardmost latch 266, to retain the empty box in loading position beneath the elevator H by engaging its front wall 282.

The trailing end of the support channel 264 (FIGS. 12, 14 and 15) is provided with an upwardly and rearwardly directed support plate 302 having a lower ledge portion 304 which is adapted to be supported by a roller 306. The roller 306 is mounted on a rotatable shaft 308 that is biased by a torsion spring 310 toward a position maintaining the roller 306 in engagement with the undersurface of the ledge 304. The roller 306 thus supports the box carrier K in its horizontal box loading position. In order to prevent the box carrier from moving away from the machine, the ledge 304 of the support plate 302 is interposed between a fixed frame member 312 and a strap 314 which is bolted to the frame member 312 and is spaced therefrom to permit free vertical movement of the ledge 304 within the limits above described.

A heavy tension spring 316 is connected to the support plate 302 and to a superposed fixed frame member 318, the force of the spring being sufficient to overcome the weight of the box carrier K plus one empty box J1 and one nearly full box J. When the trailing box J has been filled with fruit dropped from the discharge end of the elevator H, the latch shaft 308 is manually rotated by means of a handle 320 on its upper end, so that the roller 306 (FIG. 14) is rotated out of engagement with the ledge 304. Since the spring 316 will not support the combined weight of the box carrier and the full and empty boxes, the box carrier K tilts downward from its hinge shaft 262 until its trailing end strikes the ground.

When the box carrier K is dropped to the ground, the rear wall 284 of the trailing box J drops away from engagement with the box abutment strap 300, and the filled box rolls onto the ground for pickup by the fork lift truck. It is important to note that the box discharge operation, as well as the box pickup operation, can be carried out while the harvesting machine 20 is moving along the row of trees and in no way interrupts forward travel of the harvesting machine 20.

The box abutment 300 is pivotally mounted at one end by a pin 322 to a fixed frame member. The other end of the box abutment 300 is retained by a clip 324 which has a lower end 324A welded to the fixed frame member 312 and an offset upper end 324B defining a socket for receiving the member 300. Thus, a box which is only partially full can be removed from the box carrier K, if so desired, by pivoting the box abutment 300 upwardly out of engagement with the box and by then pushing the box rearwardly off the box carrier K.

When the filled box J (FIGS. 14 and 15) moves rearwardly onto the ground, it pulls the empty box J1 rearwardly into filling position beneath the elevator H by means of a U-shaped clip 326 (FIG. 14) which is manually positioned over the adjacent walls 282 and 284 of the leading and trailing boxes, respectively, at the time the boxes are initially placed upon the carrier K. When the filled box J drops away from the box carrier, it disengages the U-shaped clip 326 and the spring 316 returns the carrier K to its horizontal loading position in time for the rear wall 284 of the empty box J1 to engage the box abutment 300.

It will be apparent that because of the outrigger mounting of the box carrier K, the weight concentrated upon the drive wheel assembly N increases as the box on the carrier is filled, while at the same time the weight concentrated upon the steering wheel assemblies O decreases during the box filling operation. Since ground compaction near the tree trunk T is undesirable because it eventually hampers subsequent irrigation operations, the ground adjacent the tree is subjected to minimal compaction by the harvesting machine 20 because of the described outrigger mounting of the box carrier.

The hydraulic control circuit of the drive motor M1 (FIG. 16) includes a directional control valve 328 which is connected by a conduit 330 to the discharge outlet of the pump P. The control valve 328 is actuated by mechanical linkage, not shown, that is connected between its actuating rod 334 and the valve control cable 71 (FIGS. 8 and 8A) of the combined throttle and hydraulic valve control unit 68. When the shift control lever 72 of the control unit 68 is moved in the direction of forward advance of the machine section B, the core or the valve 328 is shifted to the right, and pressurized fluid is circulated from conduit 330 through valve passage 335 and conduit 338 to the drive motor M1 in a direction causing the drive wheels 54 to propel the machine section along the row of trees. At the same time, the throttle of the engine L is opened by the cable 70, as previously mentioned, and the more the lever 72 is advanced from Neutral, the greater the speed of the machine section. If the core of the valve 328 is shifted in the opposite direction, a slanted passage 337 through the valve core directs pressurized fluid to conduit 336 to reverse the direction of the hydraulic fluid, and the machine travels backward. When the lever 72 is returned to Neutral, fluid flow is interrupted to both the conduits 336 and 338 of the motor M1 and the motor thus tends to be driven by the wheels 54 through the chain drive due to the momentum of the machine.

It will be noted that, when the shift lever 72 is put into Neutral position and the momentum of the machine tends to drive the motor M1, the fluid in the system will be pumped by the motor into one of the lines 336 or 338, according to which direction the motor M1 is being rotated. A valve unit 340 is connected in the system to prevent the free circulation of fluid so that, as soon as the lever 72 is put into Neutral, the hydraulic system will act as a brake in that it resists rotation of motor M1. The conduits 336 and 338, accordingly, are interconnected by the valve unit 340 which includes a combination pressure-relief and check valve 342 which will not pass hydraulic fluid that is below a pressure of 1000 p.s.i. from conduit 338 to conduit 336. A similar combination pressure-relief and check valve 344 of the valve 340 will not pass fluid from conduit 336 to conduit 338 until it is at a pressure of 1000 p.s.i. It will be apparent, therefore, that the motor M1 is subject to a rapid braking action when its control valve 328 is shifted from either Forward or Reverse driving position to Neutral because when the motor M1 tends to pump the fluid in its circuit, the valve unit 340 opposes such pumping action, with the result that the drive wheels 54 are rapidly braked, and when the machine stops, it is immobilized by the drive motor regardless of the degree of slope upon which the machine may be operating.

The elevator drive motor M2 is governed by a control valve 350 which is connected in series with the directional valve 328 that controls the drive motor M1. An actuating rod 329 of the valve 350 is connected by linkage, not shown, to the elevator motor control lever 154 (FIG. 1). When the core of the elevator control valve 350 is shifted to the right by actuating the elevator motor control lever 154 passage 354 of the elevator control valve 350 transmits pressurized fluid from line 352 to an inlet line 356 of the motor. An outlet line 358 circulates the fluid through the other valve passage 355 to a line 360 which is connected to the power steering control valve 112.

While the valve 112 is illustrated in FIG. 16 as having a core that is slidable longitudinally in a housing to selectively direct fluid to opposite ends of the steering cylinder 134, the valve actually used is a rotary valve Model IV-205 marketed by the Char-Lynn Company of Minneapolis, Minnesota. The core of the rotary valve is connected to a control lever 362 (FIG. 2) which is located adjacent the operator's station and is mounted for swinging movement about a vertical axis. If the lever is swung in one direction, pressurized fluid is directed from pressure conduit 360 to one side of piston 136 in cylinder 134 while, if the lever 362 is swung in the opposite direction, the pressurized fluid will be directed to the opposite side of piston 136. The angular position of the control lever 362 relative to a straight-ahead Neutral position will correspond closely to the angular position of the steerable wheels O.

As previously mentioned and, as seen in FIG. 4, the spindle of the wheel assembly O is connected by a chain drive 110 to valve 112. This connection is made through a rod 363 and, accordingly, when the wheel assembly O is turned in response to actuation of control lever 362, the rod 363 will also be turned. The rod 363 is part of a servo-control built into this type of rotary valve and indicated in FIG. 16 by reference numeral 364. The servo control is so connected to the core of the valve that if the control lever 362 is swung through a fixed angular distance, such as 10 degrees, to direct fluid to cylinder 134 to turn the wheel assembly O approximately 10 degrees, the servo control will be actuated to stop the flow of pressurized fluid to the cylinder when the wheels have been turned. If the control lever is swung slowly through a large angular displacement, the servo control will start moving as soon as the wheels O start to pivot, however, the servo control will not stop the flow of pressurized fluid to the cylinder 134 until the swinging movement of the control lever is stopped.

In the hydraulic circuit shown, steering movement of the wheels in one direction is carried out by shifting the valve core to the right to align a passage 365 with the pressure conduit 360 so that fluid is directed along conduit 140 to one side of the piston 136. Steering of the wheels in the opposite direction is carried out by shifting the valve core to the left to align a slanted passage 368 with pressure conduit 360 and direct fluid to the left side of piston 136. In such an arrangement, the servo control 364 would be arranged to slidably adjust the valve core in response to movement of the wheel assembly O.

If the valve 142 which interconnects the conduits 140 is opened, no pressure differential can exist between the chambers at each side of the piston, and the power steering system is thus ineffective. Manual steering by means of the tiller bar 148 can still be carried out because the piston rod 138 provides a solid link between the adjacent ends of the inner run of the steering cable 124.

The pressurized fluid in line 360 also enters a pressure line 370 which is connected to a shaker boom control valve 372. The valve 372 is controlled by one of the rods 152 and governs two hydraulic motors 374, the valve and both motors being a part of the shaker boom structure D. Various other standard components of the hydraulic circuit include suitable pressure relief valves 373 and a conduit 375 which returns the pressurized fluid to the reservoir R, all in the manner well known in the art.

The shaker boom structures D are commercially available Model LPS units manufactured by Gould Bros., Inc., of Milpitas, California, and their specific details are not a part of the present invention. In general such shakers include a tree-gripping head and means for rapidly reciprocating the head to shake the tree.

The particular orientation of the shaker booms, is an important feature of the present harvesting machine combination because the two shaker booms D are so located with respect to one another that the entire tree can be harvested simultaneously since the booms are so mounted relative to each other that all of the tree limbs are accessible by one or the other of the shaker booms.

The shaker boom D (FIGS. 2 and 17) of the machine section B is provided with a mounting bracket 376 that is bolted to the frame rail 28 and is welded to the lower end portion of a double-acting hydraulic cylinder 378 having a piston 380. Cylinder 378 is energized by actuating one of the control rods 152, whereby a horizontal boom support arm 382 which is secured to the upper end of the piston 380 can be positioned at the various elevations required during tree shaking operations. The piston 380 is rotatable in the cylinder 378 through a considerable arc so that the free end of the boom support arm 382 can be swung about vertical axis 383 toward or away from the tree.

Vertical pivot means, indicated by the reference axis 384 (FIG. 18) near the free end of the boom support arm 382, pivotally mount the lower leg of an L-shaped arm 386 to the arm 382, and the upper end portion of the upright leg of arm 386 carries horizontal pivot means lying on the reference axis 388. An inverted U-shaped bracket 390 is carried by the arm 386 for rocking movement about the axis 388, and the lower end portions of the depending legs of bracket 390 are pivotally connected to a collar 392, whereby the collar is free to rock about a second horizontal axis 394.

The forward end of a tubular main boom 396 is rotatably mounted in the collar 392, and a drive housing 398 is secured to its other end. The housing is provided with a pair of handles 400 by means of which the operator can swing the shaker boom about either of the horizontal axes 388 and 394 or about either of the vertical axes 383 or 384 into alignment with a selected limb of the tree. The hydraulic motors 374 (FIG. 16) are mounted one on each side of the housing 398 (FIG. 17) and are connected by eccentric means within the housing to the end of a reciprocable tubular boom member 402 which extends through the main boom 396 and carries a hydraulic cylinder 404 and a tree and a tree limb gripping claw 406 on its other end. The boom 402 can be rotated, by rotating the housing 398, so that the claw 406 will align with limbs extending from the tree trunk in any direction.

The gripping claw 406 is spring urged to the open position shown, and is closed into limb gripping position when the hydraulic cylinder 404 is actuated by manipulation of one of the control rods 152. After the limb is gripped in the claw 406, the motors 374 are energized by another rod 152, whereby the boom 402 is rapidly reciprocated longitudinally and the fruit is dislodged from the tree.

*Operation*

When a harvesting operation is to be carried out, empty boxes J (FIG. 2) are placed in the orchard along the path of the box carrier mechanisms K in accordance with the number of boxes that the expected fruit yield of the orchard will require. Each machine section A and B is then driven into the orchard by an attendant riding the machine at the operator's station C and steering the machine either by the tiller bar 148 or by the power steering control valve 112. Two successive empty boxes J in the path of the box carrier K of each machine section A and B are then manually tilted so that the carrier can be driven under the boxes, and one of the U-shaped box clips 326 (FIG. 14) is positioned over the abutting walls of the two boxes on the carrier.

Each harvesting machine section A and B continues toward the first tree to be harvested until it is longitudinally centered opposite the tree trunk T and its guide bar 34 or 34a is spaced about six to ten inches from the tree trunk. When the drive motor M1 of each machine is deenergized by moving the lever 72 of the throttle and valve control unit 68 to Neutral, the machine is held braked in position by the deenergized motor. The throttle lever 73 is then advanced to cause the engine L to drive pump P at a sufficient speed to develop the necessary hydraulic pressure to energize the elevator motor M2 and to power the shaker boom D.

In order to bridge the gap between the two harvesting machine sections A and B, the operator of section B rotates the wheel 212 counterclockwise and the shield F is thus projected toward and onto the adjacent edge of the machine section A. As the shield is projected, the automatic closure 224 folds its flexible panels around the tree trunk to prevent the loss of any fruit to be dislodged from the tree. The only remaining step to be carried out prior to the harvesting operation is for each operator to actuate the lever 154 or 154a so as to energize the elevator motors M2 of the two machine sections.

When the motor M2 of each machine is running, the associated elevator H begins operating and the fruit conveyors G and G1 advance their upper conveying flights toward the fruit collection station at the lower end of the elevator. The shaker boom D of each machine is then manipulated to direct its limb gripping claw 406 or 406a into gripping engagement with a limb of the tree, and the claws are then rapidly vibrated by actuating one of the control rods 152 or 152a. The shaker booms D (FIG. 19) are each movable to positions where the gripping claws 406 and 406a can reach to the opposite side of the tree from their respective mounting locations. This extended path of coverage is indicated by the arcs 410 and 412 that correspond to the extended positions of the booms D on machine sections A and B. Thus, a limb which may be blocked by other limbs in its path can be reached by shaker boom D on the opposite machine section.

The fruit dislodged by vibration of the tree limbs falls upon the fruit collection panels E, upon the elevators H, and upon the central fruit shield F, so that all fruit, except that which may remain on the elevators, rolls onto the conveyors G and G1 and is delivered to the fruit collection station H1 adjacent the bottom end of each elevator.

The elevators of the two machine sections carry the fruit to the discharge points above the boxes J, and the fruit is dropped into the boxes. In harvesting most varieties of prunes it is not necessary to decelerate the fruit thus dropped because prunes are not subject to the bruise damage commonly experienced with softer fruit. If the harvesting machine 20 is used with softer fruit, however, the fruit can easily be protected from bruises by the use of a flexible chute or padded guide panels, not shown, leading from the discharge end of each elevator into the trailing box J. In like manner, the upper surfaces of the fruit collection panels E can be padded; one such padding, not shown, which has proved successful is a half inch thick sheet of expanded polyurethane covered by a neoprene-impregnated nylon fabric for protection from wear and the elements. Other similar refinements can be added, such as suitable padding for the elevators H, and blowers adapted to direct an air blast upon the fruit dropping from the elevators toward the boxes so as to blow away leaves, twigs and other trash lighter than the fruit.

When all of the fruit has been collected from one tree, the shaker boom claws are disengaged from the limbs, the shield F is retracted, and each machine section is driven forward to the next tree and positioned as before to begin the next harvesting operation. After a sufficient number of trees have been harvested to fill a box on one machine section, the box carrier K is released by turning the latch handle 320 or 320a so that the full box rolls rearwardly off the carrier onto the ground for subsequent pickup by a fork lift truck. The U-shaped clip 326 automatically pulls the empty box rearwardly into filling position and the spring 316 raises the box carrier to its former position. Since each machine section A and B can be loaded with empty boxes and discharge full boxes independently of the other machine, and because neither operation will interrupt forward movement of the machine sections, the discharge and pickup of boxes in no way hampers the harvesting operation. Also, since the elevators H can be run while the machine sections are moving, the machines need not remain at the tree after all the fruit is dislodged from the tree but has not yet been placed in the box, but can progress to the next tree as the filling of the box is completed.

The reverse steering movement of the steerable wheel assemblies O enables the rapid positioning of each machine section because it facilitates the rapid lateral movement of the machine during only short longitudinal movement. Another important aspect of the invention is the feature providing for opposite turning movement of each wheel assembly until its wheel axle 118 lies on a radial line intersecting the trunk of the tree. Accordingly, the harvesting machine 20 can pivot about the tree and can be moved from one tree row to the next without any forward movement along its former line of travel. Also important to the steering functions is the outrigger mounting of the box carrier K because the load imposed upon the steering wheels actually decreases as the box is loaded with fruit.

While particular embodiments of the present invention have been shown and described it will be understood that the particular details herein set forth are capable of modification and variation without departing from the principles of the invention, and that the scope of the invention should be limited only by the scope and proper interpretation of the claims appended hereto.

The invention having thus been described, that which is believed to be new, and for which protection by Letters Patent is desired, is:

1. In a fruit harvester, a support structure having an elongate side edge, an elongate fruit guide panel unit mounted in inclined position on said structure inwardly of said edge, an elongate shield adjacent said panel unit and parallel to said panel unit and including a rigid support member at each end, a track on said support structure adjacent each end of said panel unit, a roller mounted on each rigid support member and disposed in one of said tracks, an endless chain adjacent each track and connected to the adjacent rigid support member, and means for simultaneously actuating said endless chains to move said shield from a position overhanging the side edge of said support structure to a position entirely inwardly of said edge.

2. Apparatus for harvesting fruit from trees comprising two steerable self-powered wheeled frame structures adapted to be positioned on opposite sides of a tree to be harvested, a transversely inclined guide panel mounted on each of said frame structures, said two guide panels cooperating to form fruit collecting means converging toward their adjacent lower edges, endless belt conveying means mounted along the lower edge of each of said guide panels for delivering the collected fruit to a fruit collecting station intermediate the ends of said panel, an elevating conveyor having an inlet portion adjacent one of said belt conveying means and adapted to receive the fruit delivered to the associated fruit collecting station, the discharge end of each elevator conveyor terminating adjacent the upper edge of the associated guide panel, a box carrier mounted on said frame structure beneath the discharge end of each elevator conveyor and projecting outward from the adjacent longitudinal edge of the associated frame structure, and a shaker boom mounted on each of said frame structures, said two shaker booms being movable to an aligned position lying substantially on a line which intersects the trunk of the tree.

3. A harvesting machine comprising two elongate, steerable self-powered frame structures adapted to be positioned on opposite sides of a tree to be harvested, a shield slidably mounted on one of said frame structures for bridging the distance to the other of said frame structures, means for moving said shield from a retracted position overlying its associated frame structure to a projected position in which the distal edge of the shield is supported upon the other of said frame structures, said shield being provided with flexible closure means adapted to seal around the trunk of the tree and including displaceable means mounted on said shield and engageable with the trunk of the tree when the shield is moved toward said projected position, said displaceable means being connected to said flexible closure for pursing said flexible closure around the trunk of the tree when said shield is projected, conveying means mounted on each of said frame structures along the confronting edges of said frames, each of said conveying means having a conveying flight movable toward a central fruit collection station on the associated one of said frame structures, and a fruit guide panel mounted on each of said frame structures, each guide panel having an upper marginal edge and an upper surface sloping downwardly from said edge toward the adjacent conveying flight for guiding fruit onto said flight.

4. In a harvesting machine for gathering fruit from orchard trees the combination of an elongate mobile frame structure adapted to be positioned adjacent a tree to be harvested, a shield coextensive with the edge of said frame structure and having a central aperture adapted to receive the trunk of the tree, means mounting said shield on said frame structure for movement from a retracted position overlying said frame structure to a projected position in which said aperture receives the trunk of the tree, flexible closure means mounted in said aperture for automatically sealing around the trunk of the tree when said shield is moved to said projected position, and displaceable means mounted on said shield and engageable with the trunk of the tree when the shield is moved toward said projected position, said displaceable means being connected to said flexible closure means for pursing the closure around the trunk of the tree.

5. In a harvesting machine, two elongate steerable frame structures adapted to be positioned on opposite sides of a tree to be harvested, means for bridging the gap between said frame structures and automatically sealing around the trunk of the tree comprising an elongate shield coextensive with the confronting portions of said frame structures, support means slidably mounting said shield on one of said frame structures for lateral movement toward and away from the other of said frame structures, said shield having a central three-sided aperture with an end which is open in the direction of said lateral movement of the shield, the aperture being adapted to receive the trunk of the tree when the shield is projected from the frame structure on which it is mounted, said shield further having surfaces declining from its longitudinal center so as to direct fruit toward one or the other of said frame structures, a closure rod slidably mounted along the free longitudinal edge of said shield at each end of the aperture, a spring biasing each of said closure rods to a position wherein the confronting ends of the two rods lie adjacent the shield edges defining the ends of the aperture, a cable extending longitudinally of said shield and across the open end of the aperture, the ends of said cable being secured to the adjacent closure rods near the remote ends thereof, a first flexible rectangular panel overlying part of the aperture with a free edge disposed substantially on the longitudinal centerline of said shield, the opposite edge portion of said panel being secured to the shield adjacent the closed side of said aperture, resilient means connected to each corner of said rectangular panel adjacent said longitudinal centerline so as to tension said free edge of said panel, a second flexible rectangular panel overlying the forward portion of said aperture and having one edge portion secured to the adjacent shield edge which defines the forward end of the aperture and another edge portion secured to the shield adjacent the closed side of the aperture, the free corner of said second panel being secured to the adjacent end portion of the forwardmost closure rod, and a third flexible panel overlying the rearward portion of said aperture and having one edge portion secured to the adjacent shield edge which defines the rearward end of said aperture, and having another edge portion secured to the shield adjacent the closed side of the aperture, the free corner of said third panel being secured to the adjacent end portion of the rearwardmost closure rod, the cable contacting the trunk of the tree and being deflected into the area of the aperture upon projection of the shield from its associated frame structure whereby the closure rods are projected from their normally retracted positions and carry the second and third flexible panels together to seal around the trunk of the tree.

6. In a harvesting machine, a mobile support structure, power means for moving said structure along a predetermined path adjacent a row of trees, a tiltable support frame having an upper box conveying surface adapted to support a box in position to be filled, pivot means mounting said support frame on said structure for tilting movement about an axis normal to the path of said machine as it moves along a row of orchard trees, said tilting movement being from a substantially horizontal box filling position to an inclined discharge position causing a box on said conveying surface to gravitate rearwardly along said conveying surface and onto the ground, a releasable box carrier latch mounted on said support structure and engageable with said support frame to hold the frame in said box filling position, a box abutment mounted on said structure in a position engaging the upper portion of an end wall of a box on said conveying surface when the support frame is in said box filling position, and means for releasing said box carrier latch whereby said support frame tilts to said inclined discharge position and the box is discharged downwardly off said conveying surface.

7. In a machine for harvesting fruit from orchard trees and collecting the fruit in open top boxes, the combination of a support frame, a fruit gathering and discharge mechanism on said frame, a box support carried by said frame and having an upper roller conveying surface adapted to support two boxes in fore and aft abutting relation, the leading one of said boxes being positioned to receive fruit from said discharge mechanism, an inverted U-shaped clip adapted to be positioned over the abutting walls of the two boxes, pivot means mounting said box support on said frame for fore and aft tilting movement from a substantially horizontal box filling position to an inclined box discharge position in which the discharge end of said box support engages the ground, movement of said box support to said inclined position being effective to cause said roller conveying surface to convey the leading box downwardly to the discharge end of said box support, and said U-shaped clip being effective to draw the other box to fruit-receiving position adjacent said discharge mechanism as said leading box moves along said box control, a releasable box carrier latch mounted on the harvesting machine and engageable with said support frame to support said frame in said box filling position, a box abutment mounted on the harvesting machine in a position wherein the trailing wall of said trailing box engages said abutment when said support frame is in said box filling position, counterbalance means connected to said box support frame for maintaining said frame in said box filling position independently of said releasable latch means only when the total weight of fruit in said trailing box is less than its total capacity, and means for releasing said box carrier latch when the trailing box is full whereby said counterbalance means is overcome by the weight of the full box of fruit and the support frame tilts to said box discharge position.

8. In a machine for harvesting fruit from orchard trees and collecting the fruit in open top boxes, the combination of a support frame, a fruit gathering and discharge mechanism on said frame, a box support frame carried by said frame and having an upper roller conveying surface adapted to support two boxes in fore and aft abutting relation, the leading one of said boxes being positioned to receive fruit from said discharge mechanism, an inverted U-shaped clip adapted to be positioned over the abutting walls of the two boxes, and pivot means mounting said box support on said frame for fore and aft tilting movement from a substantially horizontal box filling position to an inclined box discharge position in which the discharge end of said box support engages the ground, movement of said box support to said inclined position being effective to cause said roller conveying surface to convey the leading box downwardly to the discharge end of said box support, and said U-shaped clip being effective to draw the other box to fruit-receiving position adjacent said discharge mechanism as said leading box moves along said box roller conveying surface.

9. In a machine for harvesting fruit from orchard trees and collecting the fruit in open top boxes, a mobile support structure, means on said structure for collecting and discharging fruit, a tiltable support frame having an upper roller conveying surface adapted to support two boxes in fore and aft abutting relation, the leading one of said boxes being supported in filling position adjacent said fruit discharge means, pivot means mounting said support frame on said support structure for fore and aft tilting movement of said frame from a substantially horizontal box filling position to an inclined box discharge position in which the trailing end of said support frame engages the ground, a releasable box carrier latch mounted on said mobile structure and adapted to support said frame in said box filling position, a box abutment mounted on said mobile structure in a position wherein the trailing wall of said leading box engages said abutment only when said support frame is in said box filling position, counterbalance means connected between said mobile structure and said box support frame for maintaining said frame in said box filling position independently of said releasable latch means when the total weight of fruit in said trailing box is less than its total capacity, and means for releasing said box carrier latch when the trailing box is full whereby said counterbalance means is overcome by the weight of the full box of fruit and the support frame tilts to said box discharge position, and full box being movable out of engagement with said box abutment and being discharged onto the ground from said roller conveying surface incident to tilting of said frame.

10. In a machine for harvesting fruit from orchard trees and collecting the fruit in open top boxes, a mobile support structure, means on said structure for collecting and discharging fruit, a box support frame having an upper roller conveying surface adapted to support two boxes in fore and aft abutting relation, the leading one of said boxes being supported in fruit-receiving position adjacent said fruit discharge means, pivot means mounting said box support frame on said structure for fore and aft tilting movement from a substantially horizontal box filling position to an inclined box discharge position in which the trailing end of said support frame engages the ground, a releasable box carrier latch mounted on said support structure and adapted to support said box frame in said box filling position, a box abutment mounted on said structure in a position adjacent said box support frame in the path of rearward movement of the box on said roller conveying surface, said box support frame including a channel member adapted to slidably engage the inner walls of said boxes, a box latch mounted atop said channel member adjacent its leading end, said box latch including a pair of independently movable superposed latch plates of different lengths pivotally mounted on said channel member, spring means resiliently biasing each latch plate toward a position wherein its free end portion will engage an end wall of a box to prevent the box from being dislodged forwardly off said box support frame, the spacing between the longest latch plate and said box abutment being slightly greater than the combined length of two of the shortest boxes and the length between the shortest latch plate and said abutment being slightly greater than the combined length of two of the longest boxes, counterbalance means connected between said structure and said box support frame, said counterbalance being effective to maintain said frame in said box filling position independently of said releasable latch means when the total weight of fruit in said trailing box is less than its total weight-carrying capacity, and means for releasing said box carrier latch when the trailing box is full whereby said counterbalance means is overcome and the support frame tilts to said box discharge position, said full box being movable out of engagement with said box abutment incident to tilting of said frame and being discharged onto the ground from said roller conveying surface.

11. In a harvesting machine, a mobile support structure, a box support frame having an upper box conveying surface, pivot means mounting said support frame on said mobile structure for movement about a horizontal axis between an upper substantially horizontal box filling position and a lower box discharge position in which the trailing end of said frame engages the ground, a releasable box carrier latch mounted on said mobile structure and operatively engaged with said frame for supporting said frame in said box filling position, a box abutment mounted on said machine and engageable with one wall of a box on said frame when said support frame is in said box filling position, a spring connected to the free end of said support frame and to said harvesting machine for maintaining said frame in said box filling position independently of said box carrier latch when the box contains less than its total capacity of fruit, and means for releasing said box carrier latch so that a filled box of fruit will cause the box carrier to tilt to said box discharge position and discharge the filled box, said spring being arranged to return said carrier to said box filling position when the full box has been discharged.

12. In a harvesting machine, the combination comprising an elongate frame structure, a drive wheel support beam pivotally mounted intermediate its ends on one longitduinal edge of said frame structure for fore and aft rocking movement about an axis transverse to said frame structure, said axis lying in a vertical plane substantially bisecting said frame structure, a pair of drive wheels carried by said wheel support beam, a steerable wheel supporting each end of said frame, a steering yoke including a vertical turning pin pivotally mounting each of said steerable wheels on said frame structure at points equidistant from said vertical plane and adjacent the other longitudinal edge of said frame structure, steering control means interconnecting said steering yokes for simultaneously turning said steerable wheels in directions of opposite steering movement, and a box support frame mounted on said frame structure and projecting laterally therefrom beyond said drive wheels, said box support frame having an upper box conveying surface at its distal end portion adapted to support a box in filling position, the weight of a box being loaded thereon concentrating increased weight upon said drive wheels and at the same time decreasing the weight upon said steerable wheels due to the cantilever projection of said box support frame outward and beyond said drive wheels.

13. In a harvesting machine the combination comprising an elongate frame, and drive wheel means and steerable wheel means supporting said frame, said steerable wheel means being positioned adjacent one longitudinal edge of said frame and adjacent each end portion thereof, said drive wheel means being positioned adjacent the other longitudinal edge of said frame and substantially equidistant from each of said steerable wheel means, and box support means adjacent said drive wheel means and projecting laterally outward from said frame to a point beyond said drive wheel means, the free end portion of said box support means being adapted to support a box in loading position whereby the box as it is loaded increases the weight upon said drive wheel means and decreases the weight upon said steerable wheel means in order to facilitate traction and steering, respectively, and to minimize ground compaction from said steerable wheel means.

14. A wheel support and steering arrangement for a fruit harvesting machine comprising an elongate frame structure, a steerable wheel supporting each end of said frame structure and positioned adjacent one edge of said frame structure, drive wheel means mounted on the opposite edge of said frame structure and providing support for said frame structure at a point lying in a vertical plane substantially bisecting said frame structure in a transverse direction, and steering means capable of simultaneously turning said steerable wheels in opposite steering directions, the axes of rotation of said steerable wheels when turned from straight-ahead positions always intersecting said vertical plane at a common point lying in said plane whereby said frame structure is adapted to follow a circular path about said point of intersection, and a box support frame projecting outwardly from said structure adjacent said drive wheel, said box support frame being adapted to support a box in a position outwardly beyond said drive wheel means so that as the box is loaded the weight upon said drive wheel means increases and the weight upon said steerable wheels decreases.

15. A fruit harvesting machine comprising two steerable and self-powered wheeled frame structures adapted to be positioned on opposite sides of a tree to be harvested, a transversely inclined fruit guide panel mounted on each of said frame structures, the two guide panels cooperating to form fruit collecting means converging toward their adjacent lower edges, a shaker boom mounted on each frame structure, one of said shaker booms being positioned adjacent the leading end of one of said frame structures and the other shaker boom being positioned adjacent the trailing end of the other of said frame structures, each of said frame structures including a drive wheel support beam pivotally mounted intermediate its ends on the outer edge of said frame structure for fore and aft rocking movement about an axis transverse to said frame structure, an axle carried by each end of said drive wheel support beam, a drive wheel rotatably mounted on each of said axles, a drive motor mounted on said drive wheel support beam, a driven sprocket secured to each of said drive wheels, an endless chain trained around said drive sprocket and connected to said motor, a steerable wheel supporting each end of said frame structure adjacent the inner longitudinal edge of said frame, and steering control means interconnecting said steerable wheels for effecting simultaneous and uniform turning of said steerable wheels in directions of opposite steering movement.

16. A fruit harvesting machine comprising two steerable and self-powered wheeled frame structures adapted to be positioned on opposite sides of a tree to be harvested, a transversely inclined fruit guide panel mounted on each of said frame structures, the two guide panels cooperating to form fruit collecting means converging toward their adjacent lower edges, a shaker boom on each frame structure, one of said shaker booms being mounted adjacent the leading end of one of said frame structures and the other shaker boom being mounted adjacent the trailing end of the other of said frame structures whereby both sides of the tree may be harvested simultaneously each of said frame structures having a drive wheel support beam pivotally mounted intermediate its ends on the outer edge of said frame structure for fore and aft rocking movement about a transverse axis lying in a vertical plane substantially bisecting said frame structure, a drive wheel carried by said drive wheel support beam, a steerable wheel supporting each end of said frame structure adjacent the inner edge thereof, a steering yoke including a substantially vertical turning pin pivotally mounting each of said steerable support wheels on said frame structure at points equidistant from said transverse axis and adjacent said inner edge of said frame, and steering control means interconnecting said steerable support wheels for simultaneously and uniformly turning said steering yokes and said steerable wheels in directions of opposite steering movement.

17. A fruit harvesting machine comprising two steerable and self-powered wheeled frame structures adapted to be positioned on opposite sides of a tree to be harvested, each of said frame structures having inner and outer longitudinal edges, a transversely inclined fruit guide panel mounted on each of said frame structures, the two guide panels cooperating to provide fruit collecting means converging toward their adjacent lower edges, a shaker boom mounted on each frame structure, one of said shaker booms being positioned adjacent the leading end of one of said frame structures and the other shaker boom being positioned adjacent the trailing end of the other of said frame structures whereby both sides of the tree may be harvested simultaneously, each of said frame structures including drive wheel means mounted on the outer edge of said frame structure, a steerable wheel supporting each end of said frame structure adjacent said inner edge thereof, a steering yoke including a substantially vertical turning pin pivotally mounting each of said steerable support wheels on said frame structure at points substantially equidistant from said drive wheel means, steering control means interconnecting said steerable support wheels for simultaneously and uniformly turning said steering yokes and said steerable wheels in directions of opposite steering movement, and a box support frame mounted on said frame structure and projecting laterally therefrom beyond said drive wheel means, said box support frame having a box support surface at its free end portion for supporting a box in filling position outwarldy beyond said drive wheel means whereby the weight of a box being loaded simultaneously increases the weight upon said drive wheel means and decreases the weight upon said steerable wheels in order to facilitate traction and steering, and to minimize ground compaction adjacent the trunk of the tree.

References Cited by the Examiner

UNITED STATES PATENTS

| | | | |
|---|---|---|---|
| 1,147,411 | 7/1915 | Lansden | 180—21 |
| 1,412,419 | 4/1922 | Pelling | 180—21 |
| 1,484,312 | 2/1924 | Washburn | 180—79 |
| 1,536,167 | 5/1925 | Totten | 56—329 |
| 1,732,127 | 10/1929 | Helsel | 56—329 |
| 1,748,041 | 2/1930 | Backhus | 180—77 |
| 1,928,915 | 10/1933 | Stout | 180—77 |
| 2,129,187 | 9/1938 | Wesnigk | 180—21 |
| 2,244,524 | 6/1941 | Lima | 214—518 |
| 2,301,152 | 11/1942 | Strehlow | 180—79 |
| 2,386,881 | 10/1945 | Phillips | 56—329 X |
| 2,436,648 | 2/1948 | Isom | 56—329 |
| 2,508,877 | 5/1950 | Walker et al. | 214—518 |
| 2,554,785 | 5/1951 | Leliter | 180—22 |
| 2,643,754 | 6/1953 | Doak. | |
| 2,692,470 | 10/1954 | Bowman | 56—328 |
| 2,714,281 | 8/1955 | Steele | 56—329 |
| 3,064,745 | 11/1962 | Colt et al. | 180—79.2 X |
| 3,092,272 | 6/1963 | Weigel | 214—501 |
| 3,105,342 | 10/1963 | Hahn et al. | 56—329 |
| 3,114,998 | 12/1963 | Weisser. | |

FOREIGN PATENTS 566,132  11/1932  France.

ANTONIO F. GUIDA, *Acting Primary Examiner.*

RUSSELL R. KINSEY, *Examiner.*